United States Patent
Meyer

(10) Patent No.: US 9,751,474 B2
(45) Date of Patent: Sep. 5, 2017

(54) METHOD FOR CONFIGURING A CONTROL UNIT, CONTROL UNIT AND VEHICLE

(71) Applicant: AUDI AG, Ingolstadt (DE)

(72) Inventor: Juergen Meyer, Kinding (DE)

(73) Assignee: AUDI AG, Ingolstadt (DE)

( * ) Notice: Subject to any disclaimer, the term of this patent is extended or adjusted under 35 U.S.C. 154(b) by 41 days.

(21) Appl. No.: 14/435,271

(22) PCT Filed: Oct. 4, 2013

(86) PCT No.: PCT/EP2013/002990
§ 371 (c)(1),
(2) Date: Apr. 13, 2015

(87) PCT Pub. No.: WO2014/056593
PCT Pub. Date: Apr. 17, 2014

(65) Prior Publication Data
US 2015/0239406 A1   Aug. 27, 2015

(30) Foreign Application Priority Data

Oct. 12, 2012  (DE) ................. 10 2012 019 993

(51) Int. Cl.
G05D 1/00   (2006.01)
G05D 3/00   (2006.01)
(Continued)

(52) U.S. Cl.
CPC ............ B60R 16/023 (2013.01); B60R 16/02 (2013.01); H04L 12/4625 (2013.01)

(58) Field of Classification Search
CPC .... B60R 16/02; B60R 16/023; H04L 12/4625
(Continued)

(56) References Cited

U.S. PATENT DOCUMENTS

2005/0283278 A1* 12/2005 Boutin ................... G06F 8/65
 701/1
2007/0038337 A1* 2/2007 Hofmann .............. G05B 19/042
 701/1
(Continued)

FOREIGN PATENT DOCUMENTS

DE  10301899  7/2004
DE  10334587  2/2005
(Continued)

OTHER PUBLICATIONS

German Office Action for German Priority Patent Application No. 10 2012 019 993.7, issued Sep. 27, 2013, 6 pages.
(Continued)

Primary Examiner — Calvin Cheung
Assistant Examiner — Paula L Schneider
(74) Attorney, Agent, or Firm — Staas & Halsey LLP

(57) ABSTRACT

In order to configure a control unit for a vehicle, a method is provided which involves: transmission of a functional cluster assignment by a data source to the control unit, the functional cluster assignment assigning the control unit to a selection of functional clusters; reception of the functional cluster assignment by the control unit; preparation of the control unit for the use of the functional cluster assignment; activating the validity of the functional cluster assignment in the control unit, and use of the functional cluster assignment in the control unit. The functional cluster assignment is transmitted via a data network, preferably formed using a CAN bus, LIN bus, MOST bus or FlexRay bus system. The downloading of the functional cluster assignment to the control unit makes software releases that are specific to vehicle type and the time spent on their associated program maintenance superfluous.

19 Claims, 2 Drawing Sheets

(51) Int. Cl.
*G06F 7/00* (2006.01)
*G06F 17/00* (2006.01)
*B60R 16/023* (2006.01)
*B60R 16/02* (2006.01)
*H04L 12/46* (2006.01)

(58) Field of Classification Search
USPC .......................................................... 701/1
See application file for complete search history.

(56) References Cited

U.S. PATENT DOCUMENTS

| | | | |
|---|---|---|---|
| 2011/0119556 A1* | 5/2011 | de Buen | H04L 41/12 |
| | | | 714/758 |
| 2012/0245786 A1 | 9/2012 | Fedorchuk et al. | |

FOREIGN PATENT DOCUMENTS

| | | |
|---|---|---|
| DE | 102005026989 | 12/2006 |
| DE | 102005061393 | 7/2007 |
| DE | 102006036441 | 2/2008 |
| DE | 102007062114 | 7/2009 |
| DE | 10 2012 019 993.7 | 10/2012 |
| EP | 1959606 | 8/2008 |
| WO | 2010/054920 | 5/2010 |
| WO | PCT/EP2013/002990 | 10/2013 |

OTHER PUBLICATIONS

English language of International Search Report for PCT/EP2013/002990, mailed Jan. 27, 2014, 2 pages.

WIPO English Language Translation of the International Preliminary Report on Patentability for PCT/EP2013/002990, mailed on Apr. 16, 2015, 9 pages.

* cited by examiner

METHOD FOR CONFIGURING A CONTROL UNIT, CONTROL UNIT AND VEHICLE

CROSS REFERENCE TO RELATED APPLICATIONS

This application is based on and hereby claims priority to International Application No. PCT/EP2013/002990 filed on Oct. 4, 2013 and German Application No. 10 2012 019 993.7 filed on Oct. 12, 2012, the contents of which are hereby incorporated by reference.

BACKGROUND

The present invention relates to a method for configuring a control unit. The control unit may be part of a vehicle or of another apparatus, for example a production apparatus. "Control unit" denotes a controller or a part of a controller.

In addition, the invention relates to a control unit.

Furthermore, the invention relates to a vehicle.

Control functions of a vehicle are allocated to function groups. These function groups are referred to as function clusters. The following function clusters are typical, for example: drive, chassis, safety, telematics, man/machine interface, bodywork functions and added-convenience functions. The assignment (allocation) of a controller to one or more function clusters is referred to as function cluster assignment or as configuration. To date, the function cluster assignment is stipulated in the program code of the controller during manufacture or when the controller is first started up. Each message (PDU=packet data units) that is exchanged between the controllers contains no more than 64 bits that the data source of the message can use to denote assignment or non-assignment of the message to each of no more than 64 function clusters for the receiving controllers. This limits the number of possible function clusters to 64 function clusters.

Although the address space of 64 function clusters is sufficient to distinguish all function clusters of a vehicle today, there is the following further development requirement, which is not readily compatible with the limitation to no more than 64 function clusters. Vehicle construction uses a building block principle, particularly also for control units and a software thereof. This results not only in a control unit typically being installed with the same software in different vehicle types (vehicle derivatives) but also in the same control unit being used in the different vehicle types with different subsets of function clusters. Hence, the function cluster assignment to be configured in the controller software is dependent not only on the controller type but also on the precise vehicle type (vehicle derivative). Since the function cluster assignment needs, according to the related art, to be stipulated in the program code of the controller during manufacturer or when the controller is first started up, this results in vehicle-type-specific software versions in practice, that is to say in an increase in the number of software versions for the same type of control unit. The wide variety of software versions significantly increases software maintenance expenditure and costs per controller.

SUMMARY

One possible object is to provide a method for configuring a control unit that allows a reduction in software maintenance expenditure per controller.

For the purpose of configuring a control unit, the inventor proposes a method that comprises the following: transmission of a function cluster assignment from a data source to the control unit, wherein the function cluster assignment allocates the control unit to a selection of function clusters, reception of the function cluster assignment by the control unit, preparation of the control unit for use of the function cluster assignment, validation of the function cluster assignment in the control unit and use of the function cluster assignment in the control unit.

Provision of the method allows the function cluster assignment to be configured in the control unit in a manner specific to vehicle type even without vehicle-type-specific controller software. Reloadability of the function cluster assignment into the control unit means that vehicle-type-specific software versions and the associated software maintenance expenditure become superfluous.

In relation to the control unit, the control unit is prepared to carry out the proposed method.

In relation to the vehicle, it comprises at least one proposed control unit.

A preferred embodiment provides for the transmission of the function cluster assignment to be effected via a data network and/or via a data bus.

It may be expedient if transfer of a command for preparing the control unit for use of the function cluster assignment is effected via a data network and/or via a data bus. Alternatively or in addition, transfer of a command for validating the function cluster assignment can be effected via a data network and/or via a data bus.

It is preferred if in a reading process, a data sink can read the function cluster assignment via a data network and/or via a data bus. Each of the four aforementioned measures can be used to avoid expenditure for a dedicated infrastructure for the cited transfer tasks by using a data network that is usually in place anyway or a data bus that is usually in place anyway.

It is particularly preferred if the data bus is a CAN bus, a LIN bus, a MOST bus and/or a FlexRay bus. As a result, transfer technology is used that is tried and tested, and has been introduced, in vehicles.

It is useful if the transmission of the function cluster assignment and/or transfer of a command for preparing the control unit for use of the function cluster assignment and/or transfer of a command for validating the function cluster assignment is effected by a diagnosis protocol, a network management protocol, a monitoring protocol or a measurement protocol. This assists the configuration of a control unit with maintenance-level or other related means that fit this objective.

It is advantageous if the transmission of the function cluster assignment and/or the preparation of the control unit for use of the function cluster assignment and/or the validation of the function cluster assignment prompts erasure of another, older function cluster assignment in the control unit. Each of these measures allows the data memory of the control unit to be released and/or cleared up and the likelihood of unintentional operation with an older function cluster assignment to be reduced.

There are also advantages if the transmission of the function cluster assignment prompts the function cluster assignment to be received by a plurality of control units simultaneously and/or if the preparation of the control unit for use of the function cluster assignment prompts a plurality of control units to prepare for the use of the function cluster assignment simultaneously and/or if the validation of the function cluster assignment prompts the function cluster assignment to validate it in a plurality of control units simultaneously. If a plurality of control units having an identical function cluster assignment need to be configured, this allows the time that is required for configuring a plurality of control units to be shortened.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
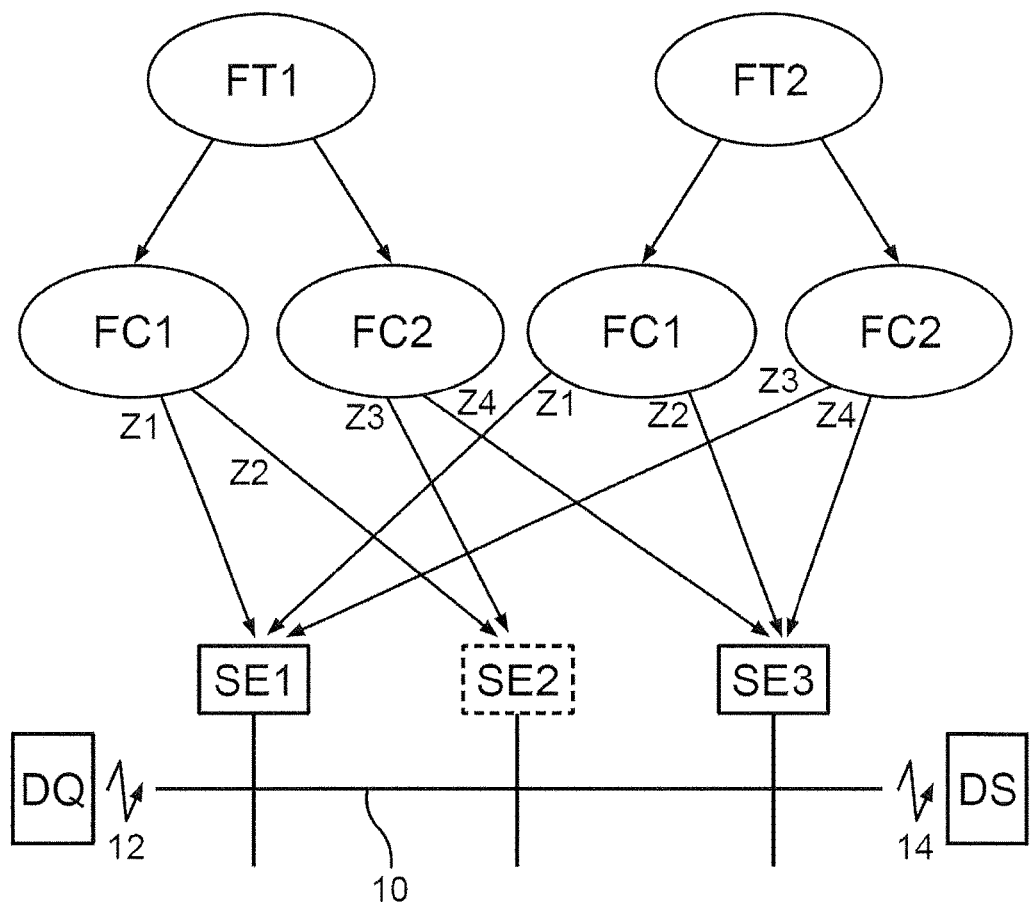
FIG. 1 schematically shows a simple function cluster assignment for two different vehicle types.

Reference will now be made in detail to the preferred embodiments of the present invention, examples of which are illustrated in the accompanying drawings, wherein like reference numerals refer to like elements throughout.

FIG. 1 schematically shows a bus system 10 with a plurality of control units SE1, SE2, SE3 connected thereto. In addition, the figure shows a data source DQ, which itself may be a control unit. The data source DQ feeds its data into the data bus 10 directly or into the data bus 10 via another communication path 12 (for example via a router or a bridge). Furthermore, the figure shows an optional data sink DS, which may be identical to a control unit on the data bus 10 or to the data source DQ. The data source DQ receives its data via the data bus 10 directly or from the data bus 10 via another communication path 14 (for example via a router or a bridge).

Typically, the control units SE1, SE2, SE3, the data source DQ and the data sink DS are located in one and the same vehicle. Alternatively, an arrangement is conceivable in which a subset or each of these units SE1, SE2, SE3, DQ, DS is located at a different location or in a different vehicle and is connected to the data bus 10 by radio links and/or fixed-location communication paths. By way of example, an exemplary application therefor is a service vehicle that contains just one data source DQ and one data sink DS for arbitrary vehicles from a vehicle manufacturer that are to be repaired.

Furthermore, the figure shows a function cluster assignment z1, z2, z3, z4 for the control units SE1, SE2, SE3, SE4 of a first vehicle type FT1 and of a second vehicle type FT2. A function cluster may have a plurality of associated control units. By way of example, the function cluster FC1 of the vehicle type FT1 has the associated control units SE1 and SE2. One and the same control unit may be associated with a plurality of function clusters. By way of example, the control unit SE2 of the vehicle type FT1 is associated both with the function cluster FC1 and with the function cluster FC2. The function cluster assignment for the two vehicle types FT1, FT2 is very different. By way of example, for the vehicle type FT1 the control unit SE2 is associated with both function clusters FC1 and FC2, while just for the vehicle type FT2 the control unit SE1 is also associated with the function cluster FC2 and the control unit SE3 is also associated with the function cluster FC1.

This example (which is simple and chosen at random from an infinite number of possibilities for the purpose of explanation) makes it clear that the sum of the function cluster assignments z1, z2, z3, z4 of the control units SE1, SE2, SE3, SE4 may be very different between the first vehicle type FT1 and the second vehicle type FT2 despite many commonalities.

Figure 2:
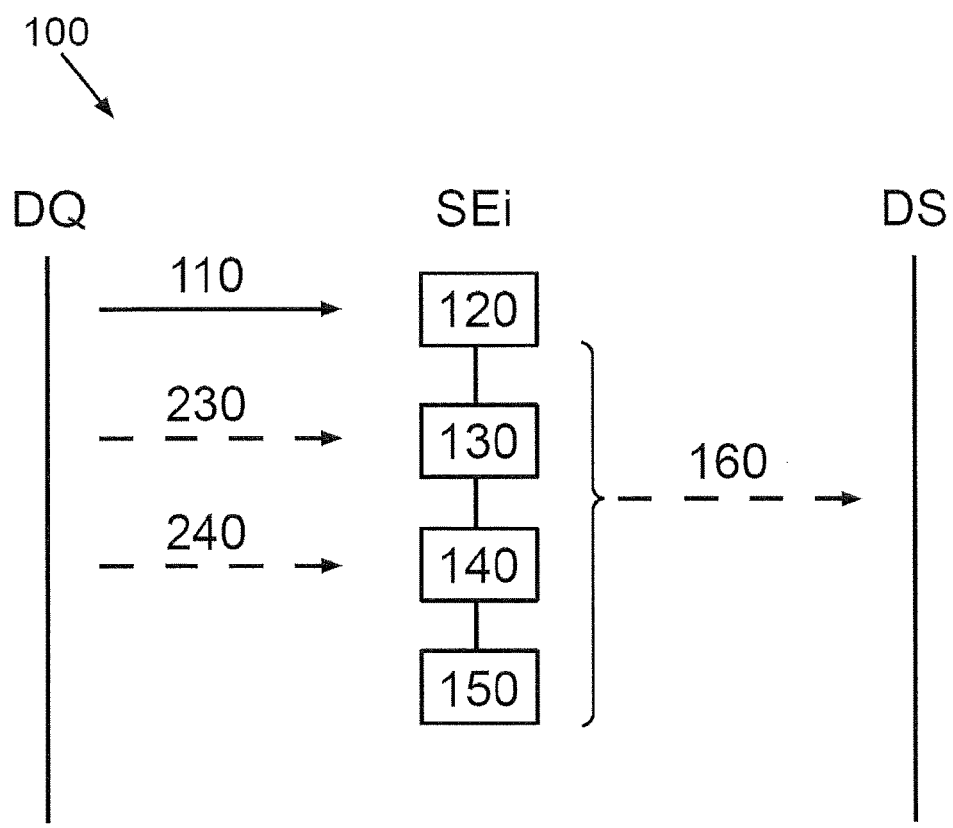
FIG. 2 schematically shows a message exchange diagram for a method for configuring a control unit.

FIG. 2 shows a message exchange diagram with a sequence for a method 100 for configuring a control unit SEi. The method 100 comprises the following. First, in 110, a function cluster assignment Zi=(z1, z2, z3, z4) is transmitted from a data source DQ to the control unit SEi, wherein the function cluster assignment Zi allocates a control unit SEi to a selection of function clusters FCj. Second, in 120, the function cluster assignment Zi is received by the control unit SEi. Third, in 130, the control unit SEi is prepared for use of the function cluster assignment Zi. Fourth, in 140, the function cluster assignment Zi is validated in the control unit SEi. Fifth, in 150, the function cluster assignment Zi is used in the control unit SEi.

In an optional further development, a command 230 for preparing 130 the control unit SEi for use 150 of the function cluster assignment Zi can be transferred. Alternatively or in addition, a command 240 for validating 140 the function cluster assignment Zi can be transferred via a data network and/or effected via a data bus 10.

A further development provides for the transmission 110 of the function cluster assignment Zi and/or the transfer of one or more of the aforementioned command types 230, 240 to be effected by a diagnosis protocol.

It is particularly preferred if the transmission 110 of the function cluster assignment Zi and/or the preparation 130 of the control unit SEi for use 150 of the function cluster assignment Zi and/or the validation 140 of a function cluster assignment Zi prompts erasure of another, older function cluster assignment in the control unit SEi.

If there are a plurality of control units SEi that are to be configured in the same way, loading of the function cluster assignment Zi into these control units SEi can be speeded up by virtue of the transmission 110 of the function cluster assignment Zi prompting the function cluster assignment Zi to be received by a plurality of control units SEi of the same type simultaneously. Alternatively or in addition, the use 150 of the function cluster assignment Zi can be prepared for a plurality of control units SEi simultaneously.

It is of particular advantage if the validation 140 of the function cluster assignment Zi prompts the function cluster assignment Zi to be validated in a plurality of control units SEi simultaneously. This makes it possible to avoid simultaneous use 150 of function cluster assignments Zi that are incompatible with one another in the control units SEi.

The reloadable assignment Zi of the function clusters FCi allows a wide variety of vehicle derivatives FTi to be realized with one and the same piece of software. The function cluster assignment Zi can therefore be changed at any time. This can be effected directly by a network master DQ or an external tool. In this case, the function cluster assignment Zi is distributed to all control units SEi that are connected in the network 10. The function cluster assignment Zi can be changed at any time. As a result, no additional software versions are required for different vehicle derivatives FTi. Each control unit SEi in the vehicle is always brought to the version of the function clusters FCi that is current in the vehicle.

The text below provides a more detailed explanation of how the proposed method can be carried out.

A previously defined service can be used by a network master DQ to transmit a new function cluster assignment Zi. This may be a diagnostic tester or another data source DQ in the network 10, for example. This new function cluster assignment Zi is then distributed throughout the network 10 by the network master DQ. For this, the network master DQ uses the diagnosis protocol that is in place in the network 10, for example, and hence sets up a connection to every single control unit SEi in the network 10 and loads the new function cluster assignment Zi.

An external tool DQ that has direct access to the network 10 can likewise distribute the new function cluster assignment Zi to every single control unit SEi in the network 10. To do this, it can use a diagnosis protocol that is in place anyway, for example. This likewise involves every single control unit SEi in the network 10 being addressed and the new assignment Zi being transferred.

Each control unit SEi then loads the assignment Zi of the function clusters FCi that is stored in the control unit SEi and configures all affected software layers for the new function cluster assignment Zi. Following a subsequent reset for the system, the new function cluster assignment Zi is valid in the network 10. The individual function cluster assignments Zi (stored in the controllers SEi) can be readable by the network master DQ at any time.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. A method for configuring a control unit in a vehicle, comprising:
   transmitting a vehicle-type-specific function cluster assignment for the vehicle from a data source to the control unit, the function cluster assignment allocating the control unit to a vehicle-type-specific selection of function clusters,
   the function cluster assignment allocating one of the different subsets of function clusters that can be allocated to the control unit, such that with the subset of function clusters allocated to the control unit, the control unit is assigned to perform functions for one function cluster or to simultaneously perform functions for a plurality of function clusters;
   receiving the function cluster assignment by the control unit;
   preparing the control unit for use of the function cluster assignment;
   validating the function cluster assignment in the control unit; and
   controlling the allocated function cluster assignment subset.

2. The method as claimed in claim 1, wherein the function cluster assignment is transmitted via at least one of a data network and a data bus.

3. The method as claimed in claim 2, wherein
   the function cluster assignment is transmitted via a data bus, and
   the data bus is selected from the group consisting of a CAN bus, a LIN bus, a MOST bus and a FlexRay bus.

4. The method as claimed in claim 1, wherein
   the control unit prepares for use of the function cluster assignment upon receiving a command for preparing for use of the function cluster assignment, and
   the command is transferred to the control unit via at least one of a data network and a data bus.

5. The method as claimed in claim 1, wherein
   the control unit validates the function cluster assignment upon receiving a command for validating the function cluster assignment, and
   the command is transferred to the control unit via at least one of a data network and a data bus.

6. The method as claimed in claim 1, further comprising reading, at a data sink, the function cluster assignment received via at least one of a data network and a data bus.

7. The method as claimed in claim 1, wherein the function cluster assignment is transmitted based on a protocol selected from the group consisting of a diagnosis protocol, a network management protocol, a monitoring protocol and a measurement protocol.

8. The method as claimed in claim 7, wherein
   the control unit prepares for use of the function cluster assignment upon receiving a command for preparing for use of the function cluster assignment, and
   the command for preparing for use of the function cluster assignment is transferred to the control unit based on a protocol selected from the group consisting of a diagnosis protocol, a network management protocol, a monitoring protocol or a measurement protocol.

9. The method as claimed in claim 8, wherein
   the control unit validates the function cluster assignment upon receiving a command for validating the function cluster assignment, and
   the command for validating the function cluster assignment is transferred to the control unit based on a protocol selected from the group consisting of a diagnosis protocol, a network management protocol, a monitoring protocol or a measurement protocol.

10. The method as claimed in claim 1, further comprising erasing an older function cluster assignment that was stored in the control unit.

11. The method as claimed in claim 10, wherein erasing the older function cluster assignment is prompted by at least one of transmission of the function cluster assignment, preparing the control unit for use of the function cluster assignment and validating the function cluster assignment in the control unit.

12. The method as claimed in claim 1, wherein
   there are a plurality of control units, each having a respective function cluster assignment, and
   the method comprises at least one of:
      simultaneously receiving the respective function cluster assignment at each of the plurality of control units,
      simultaneously preparing each of the plurality of control units for he use of he respective function cluster assignment, and
      simultaneously validating the respective function cluster assignment in each of the plurality of control units.

13. The method as claimed in claim 1, wherein
   there are plurality of control units each having a respective function cluster assignment, and
   the plurality of control units are configured such that each begins using the respective function cluster assignment simultaneously with a remainder of the control units.

14. The method as claimed in claim 1, wherein
   the control unit is a generic control unit used in a plurality of different vehicle types,
   the generic control unit operates using generic controller software that is generic to the plurality of different vehicle types, and the function cluster assignment provides for different function clusters to be controlled in different vehicle types, using the generic control unit and the generic controller software.

15. The method as claimed in claim 1, wherein the function clusters are associated with at least one of drive functions, chassis functions, safely functions, telematics functions, man/machine interface functions, body work functions and added convenience functions.

16. The method as claimed in claim 1, wherein a single control unit is assigned to at least two function clusters.

17. The method as claimed in claim 1, wherein there are a plurality of control units, and at least two control units are assigned to the same function cluster.

18. A control unit in a vehicle, the control unit comprising a control processor to:
receive a vehicle-type-specific function cluster assignment from a data source, to allocate the control unit to a vehicle-type-specific selection of function clusters, the vehicle-type-specific function cluster assignment being specific to the vehicle type of the vehicle in which the control unit is installed, the function cluster assignment being one of the different subsets of function clusters that can be allocated to the control unit, such that with the subset of function clusters allocated to the control unit, the control unit is assigned to perform functions for one function cluster or to simultaneously perform functions for a plurality of function clusters;
prepare the control unit for use of the function cluster assignment;
validate the function cluster assignment in the control unit; and
control the function cluster assignment subset.

19. A vehicle comprising at least one control unit, each control unit comprising a control processor to:
receive a vehicle-type-specific function cluster assignment from a data source, to allocate the control unit to a vehicle-type-specific selection of function clusters, the vehicle-type-specific function cluster assignment being specific to the vehicle type of the vehicle in which the control unit is installed, the function cluster assignment being one of the different subsets of function clusters that can be allocated to the control unit, such that with the subset of function clusters allocated to the control unit, the control unit is assigned to perform functions for one function cluster or to simultaneously perform functions for a plurality of function clusters;
prepare the control unit for use of the function cluster assignment;
validate the function cluster assignment in the control unit; and
control the function cluster assignment subset.

* * * * *

UNITED STATES PATENT AND TRADEMARK OFFICE
CERTIFICATE OF CORRECTION

| | | |
|---|---|---|
| PATENT NO. | : 9,751,474 B2 | Page 1 of 1 |
| APPLICATION NO. | : 14/435271 | |
| DATED | : September 5, 2017 | |
| INVENTOR(S) | : Juergen Meyer | |

It is certified that error appears in the above-identified patent and that said Letters Patent is hereby corrected as shown below:

In the Claims

Column 6, Line 50:
In Claim 12, delete "he use of he" and insert -- the use of the --, therefore.

Signed and Sealed this
Twenty-first Day of November, 2017

Joseph Matal
*Performing the Functions and Duties of the*
*Under Secretary of Commerce for Intellectual Property and*
*Director of the United States Patent and Trademark Office*